US011817765B2

(12) United States Patent
Keum et al.

(10) Patent No.: US 11,817,765 B2
(45) Date of Patent: Nov. 14, 2023

(54) OLEOPHOBIC SURFACE TREATMENTS FOR WINDAGE LOSS REDUCTION AND IMPROVED HEAT TRANSFER PROPERTIES OF ELECTRIC MACHINES

(71) Applicant: GM GLOBAL TECHNOLOGY OPERATIONS LLC, Detroit, MI (US)

(72) Inventors: SeungHwan Keum, Northville, MI (US); Mei Yang, Troy, MI (US); Neal Parsons, Novi, MI (US); Ruth Herrera Reed, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 17/401,452

(22) Filed: Aug. 13, 2021

(65) Prior Publication Data

US 2023/0046826 A1 Feb. 16, 2023

(51) Int. Cl.
*H02K 9/19* (2006.01)
*H02K 5/04* (2006.01)
(Continued)

(52) U.S. Cl.
CPC ............ *H02K 9/19* (2013.01); *H02K 1/16* (2013.01); *H02K 1/26* (2013.01); *H02K 5/04* (2013.01); *H02K 15/024* (2013.01)

(58) Field of Classification Search
CPC ...... H02K 1/2713; H02K 1/2793; H02K 9/19; H02K 5/04; H02K 15/024; H02K 1/26; H02K 3/24; H02K 1/16; H02K 5/203
See application file for complete search history.

(56) References Cited

U.S. PATENT DOCUMENTS 6,489,598 B1 * 12/2002 Hielm ..................... F24V 99/00
122/26
7,239,055 B2   7/2007 Burgman et al.
(Continued)

FOREIGN PATENT DOCUMENTS

CN          102427083 A  *  4/2012

OTHER PUBLICATIONS

CN-102427083-A machine translation on Jun. 2, 2023.*

Primary Examiner — Leda T Pham
(74) Attorney, Agent, or Firm — Quinn IP Law

(57) ABSTRACT

Presented are oleophobic surface treatments for electric machines, methods for making/using such electric machines, and vehicles employing traction motors having oleophobic treatments on select "non-target" surfaces. An electric machine includes a direct-cooling thermal management system that circulates a coolant fluid to the electric machine's outer housing. A stator assembly, which is attached to the housing, includes a stator core with one or more electromagnetic windings mounted to the stator core. A rotor assembly is rotatably mounted to the hosing adjacent the stator assembly. The rotor assembly includes a rotor core with one or more magnets mounted to the rotor core and spaced across an air gap from the winding(s). Select components of the outer housing, rotor assembly, and/or stator assembly have a target surface with an oleophobic surface treatment that reduces the non-target surface's wetted area and decreases the mass of coolant fluid contacting the non-target surface.

20 Claims, 4 Drawing Sheets

(51) Int. Cl.
    *H02K 15/02*   (2006.01)
    *H02K 1/26*    (2006.01)
    *H02K 1/16*    (2006.01)

(56) References Cited

U.S. PATENT DOCUMENTS

| | | |
|---|---|---|
| 7,307,363 B2 | 12/2007 | Pashnik et al. |
| 7,545,060 B2 | 6/2009 | Ward |
| 7,648,118 B2 | 1/2010 | Ukpai et al. |
| 7,652,404 B2 | 1/2010 | El-Refaie et al. |
| 7,998,554 B2* | 8/2011 | Wang .................. B05D 5/08 428/323 |
| 8,169,110 B2 | 5/2012 | Swales et al. |
| 8,492,952 B2 | 7/2013 | Bradfield |
| 8,508,085 B2 | 8/2013 | Bradfield |
| 10,468,920 B2* | 11/2019 | Sung .................. H02K 9/19 |
| 2011/0181136 A1 | 7/2011 | Nakamori et al. |
| 2012/0161555 A1* | 6/2012 | Sawada .................. H02K 3/50 310/54 |
| 2014/0333163 A1* | 11/2014 | Horii .................. H02K 9/10 310/59 |
| 2017/0250588 A1* | 8/2017 | Kaiser .................. H02K 1/16 |

* cited by examiner

OLEOPHOBIC SURFACE TREATMENTS FOR WINDAGE LOSS REDUCTION AND IMPROVED HEAT TRANSFER PROPERTIES OF ELECTRIC MACHINES

INTRODUCTION

The present disclosure relates generally to electric machines. More specifically, aspects of this disclosure relate to surface features for reducing windage losses and enhancing heat-transfer characteristics of oil-cooled electric traction motors.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full-electric vehicle (FEV)—colloquially an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motor(s) and a rechargeable traction battery pack that stores and supplies the requisite power for operating many hybrid and full-electric powertrains. A contemporary traction battery pack may group stacks of battery cells (e.g., 8-16 cells/stack) into individual battery modules (e.g., 10-40 modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the HV main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are three primary types of electric machines used for traction motors in modern electric-drive vehicle powertrains: brushed direct current (DC) motors, brushless DC permanent magnet (PM) motors, and multiphase alternating current (AC) PM motors. An ACPM motor is an electric machine that converts electrical energy into rotational mechanical energy using a stator with multiphase electromagnetic windings and a rotatable rotor that bears an arrangement of permanent magnets. In a radial-flux PM motor design, the magnet-bearing rotor may be coaxially nested inside the stator and the stator immovably mounted inside a motor housing. Alternatively, a PM motor may take on an axial flux arrangement in which the stator and rotor are facing, coaxial disks. The rotor, which has multiple surface-mounted or interior-mounted permanent magnets, is separated from the stator by a small air gap. Rotation of the rotor is effected by a magnetic field—produced by the flow of current through the stator windings—interacting with a magnetic field produced by the rotor's permanent magnets. During operation of a PM motor, rotational friction of the spinning rotor and electrical resistance of the electromagnetic stator generates a significant amount of heat. To improve motor efficiency and increase the motor's operational life expectancy, heat generated by the rotor and stator can be mitigated by an air-cooling, water-cooling, or oil-cooling thermal management system.

SUMMARY

Presented herein are oleophobic surface treatments for electric machines, methods for making and methods for using electric machines with oleophobic surface treatments, and electric-drive vehicles employing traction motors having "non-thermal" surfaces and radial "air gap" surfaces with oleophobic treatments. In a non-limiting example, a polyphase electric motor/generator unit (MGU) employs a direct-oil-cooling thermal management system with a coolant jacket that encases select segments of the rotor and stator. Pressurized or gravity-fed dielectric oil is pumped into the coolant jacket from a dedicated or communal sump volume; for radial-flux motors, the oil is directed across exposed hairpin crowns (also known as "end-turns") of the multiphase windings that are projecting from an axial end of the stator. To reduce coolant mass, surface energy, and wetted area on non-target surfaces of the motor assembly, an oleophobic coating or surface texturization is applied onto the interior surface of the coolant jacket, the facing, radially spaced air-gap surfaces of the rotor and stator, and/or other select surfaces. The oleophobic surface treatment may include a Cassie-Baxter State (CBS) surface roughening, a series of recessed, mutually parallel CBS channels, a nanoparticle $SiO_2$/PDDA/PFO coating, a polytetrafluoroethylene (PTFE) coating, or other oleophobic fluoropolymer coating. In addition, by selectively increasing the contact angle between the oil and non-target surface, there is a measurable increase in oil mass with a concomitant increase in total wetted area on select target surfaces along with a reduction in peak and average motor temperature.

Attendant benefits for at least some of the disclosed concepts include oleophobic surface treatments for electric machines that help to improve system cooling efficiency. By decreasing wetted area and coolant mass of non-target surfaces, for example, the requisite coolant fluid for maintaining a calibrated maximum or average motor operating temperature is reduced, with a resultant decrease in system coolant charge. With less coolant in the thermal management system, energy expenditures for operating the system pumps are reduced, which leads to improvements in overall vehicle efficiency and increased driving range. In addition, increasing a contact angle between the dielectric oil and non-target surfaces (e.g., to about 90 degrees or more) provisions a measurable decrease in oil distribution across select non-target surfaces with a corresponding increase in oil distribution across the target surfaces.

Aspects of this disclosure are directed to electric machines, such as motors, generators, transformers, inductors, dynamometers, converters, etc., with oleophobic surface treatments on one or more select surfaces. By way of example, a representative electric machine includes a protective outer housing that is selectively cooled by a direct-cooling thermal management system. The thermal management system is fluidly connected to the outer housing and operable to circulate thereto a coolant fluid, such as an engineered full-immersion liquid coolant or a lubricating dielectric transmission oil. Attached to the outer housing is a stator assembly that includes one or more electromagnetic windings, such as multiphase U-shaped hairpin windings, mounted to a stationary stator core. A rotor assembly is movably mounted adjacent the stator assembly, e.g., in a radial-flux or axial-flux arrangement. For at least some applications, the rotor assembly is rotatably disposed inside of and, thus, circumscribed by the stator assembly. The rotor assembly includes one or more magnets or induction windings that are mounted to a rotor core in spaced relation to the stator winding(s). The outer housing, rotor assembly, and/or stator assembly each has one or more non-target surfaces with an oleophobic surface treatment that reduces a wetted area of the non-target surface and decreases a coolant mass of the coolant fluid contacting the non-target surface.

Additional aspects of this disclosure are directed to motor vehicles employing traction motors having non-target surfaces—"non-thermal" surfaces and/or spaced "air gap" surfaces—with oleophobic treatments. As used herein, the terms "vehicle" and "motor vehicle" may be used interchangeably and synonymously to include any relevant vehicle platform, such as passenger vehicles (ICE, HEV, FEV, FCH, fully and partially autonomous, etc.), commercial vehicles, industrial vehicles, tracked vehicles, off-road and all-terrain vehicles (ATV), motorcycles, e-bikes, e-scooters, farm equipment, watercraft, aircraft, etc. For non-automotive applications, disclosed concepts may be employed for any logically relevant use, including stand-alone power stations, commercial or residential generators, pumping equipment, machine tools, appliances, etc. In an example, a motor vehicle includes a vehicle body with a passenger compartment, multiple road wheels rotatably mounted to the vehicle body (e.g., via wheel corner modules coupled to a unibody chassis or a body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle.

Continuing with the discussion of the above example, each traction motor includes a motor housing that is fluidly connected to a dedicated or shared direct-oil-cooling thermal management system to receive therefrom a dielectric oil. A stator assembly, which is rigidly mounted inside the motor housing, includes an annular stator core with a hollow center and multiple stator slots circumferentially spaced around the stator core. A series of U-shaped electromagnetic hairpin windings are packaged at least partially inside the stator slots. Rotatably disposed inside the hollow center of the annular stator core is a rotor assembly that includes a cylindrical rotor core with multiple rotor slots circumferentially spaced around the rotor core. An array of permanent magnets is mounted at least partially inside the rotor slots, spaced across an air gap from the hairpin windings. The motor housing's inner surface and/or the rotor and stator cores' radially spaced, facially opposing surfaces may each have a respective non-target surface with an oleophobic surface treatment that is designed to reduce a wetted area of the non-target surface and decrease a coolant mass of the dielectric oil contacting the non-target surface.

Other aspects of this disclosure are directed to manufacturing processes, control logic, and computer-readable media (CRM) for making or using any of the disclosed electric machines, PM motors, and/or vehicles. In an example, a method is presented for assembling an electric machine. This representative method includes, in any order and in any combination with any of the above and below disclosed options and features: providing an outer housing of the electric machine; fluidly connecting a direct-cooling thermal management system to the outer housing to circulate thereto a coolant fluid; attaching a stator assembly to the outer housing, the stator assembly including a stator core and an electromagnetic winding mounted to the stator core; movably mounting a rotor assembly adjacent the stator assembly, the rotor assembly including a rotor core and a magnet mounted to the rotor core spaced across and air gap from the winding; and applying an oleophobic surface treatment to a non-target surface of the outer housing, the rotor assembly, and/or the stator assembly, the oleophobic surface treatment configured to reduce a wetted area of the non-target surface and decrease a coolant mass of the coolant fluid contacting the non-target surface.

For any of the disclosed electric machines, vehicles, and methods, a "non-target" surface may include an inner surface of the outer housing, facially opposing surfaces of the rotor and stator assemblies, and/or other select surfaces. In one specific, the outer housing may include a main shell, which circumscribes both the stator assembly and the rotor assembly, and a coolant jacket, which is attached to an axial end of the main shell and fluidly connected to the direct-cooling thermal management system. In this instance, the non-target surface is an inner surface of a select segment of the coolant jacket; the oleophobic surface treatment may cover some or all of this inner jacket surface. In another non-limiting example, the rotor core is concentrically aligned inside a hollow center of the stator core. In this instance, the non-target surface includes an outer-diameter (OD) surface of the rotor core and an inner-diameter (ID) surface of the stator core; the oleophobic surface treatment may cover substantially all of these OD and ID surfaces.

For any of the disclosed electric machines, vehicles, and methods, the oleophobic surface treatment may include a CBS surface roughening with multiple recessed grooves that form air pockets between the non-target surface and the coolant fluid. Optionally, the oleophobic surface treatment may include a CBS surface imprint with a series of T-shaped recessed channels that form air pockets between the non-target surface and the coolant fluid. If desired, the oleophobic surface treatment may include a nanoparticle coating containing silicon dioxide ($SiO_2$), poly(diallyldimethylammonium) (PDDA) chloride, and/or polydioctylfluorene (PFO). As yet a further option, the oleophobic surface treatment may include an oil-repelling fluoropolymer coating. Disclosed features may be applied to radial-flux, axial-flux, PM, and induction motors.

For any of the disclosed electric machines, vehicles, and methods, the oleophobic surface treatment may include a surface etching with an anisotropic pattern applied onto the non-target surface. The surface etching may be a plasma etching, a flame etching, and/or an acid etching. Optionally, the oleophobic surface treatment may include a chemical deposition treatment of an organic compound that is applied onto the non-target surface(s) of the outer housing, rotor assembly, and/or stator assembly. The organic compound may include a dimethylformamide (DMF) material and/or a hexane-based material. As yet a further option, a hydrophobic surface treatment may be applied to one or more select surfaces of an electric machine, e.g., for reduced drag and windage losses.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1:
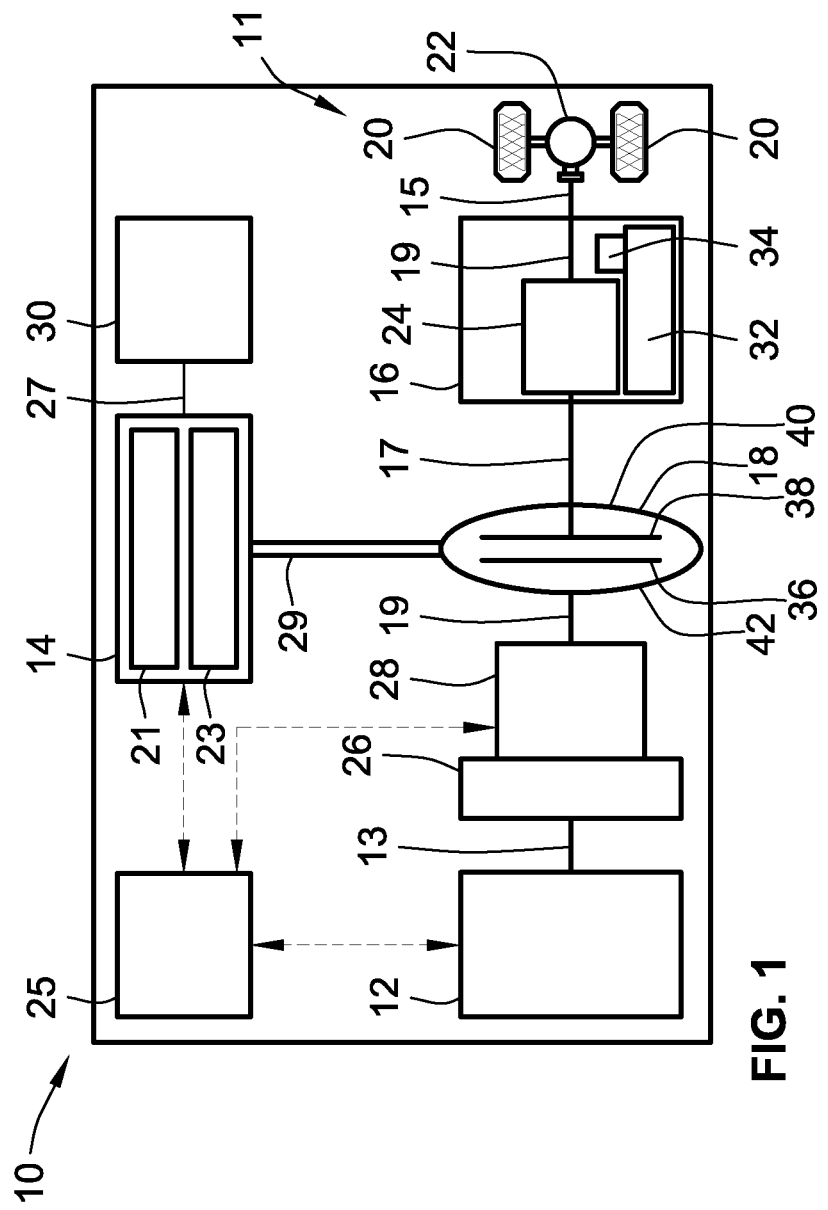
FIG. 1 is a schematic illustration of a representative electric-drive vehicle equipped with a hybrid electric powertrain having a multi-phase induction motor/generator unit (MGU) with one or more non-target surfaces treated with an oleophobic coating and/or an oleophobic texturization in accordance with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components of the motor vehicle and electric motor have been shown in the Figures and will be described in additional detail herein. Nevertheless, the electric machines and vehicles discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13, to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of a torque converter (TC) assembly 18. As the name implies, the engine disconnect device 28 may be selectively disengaged to drivingly disconnect the engine 12 from the MGU 14 (also referred to herein as "traction motor" or simply "motor"), TC assembly 18, and transmission 16.

To propel the hybrid vehicle 10, the transmission 16 is adapted to receive, selectively manipulate, and distribute tractive power received from the engine 12 and motor 14 to the vehicle's final drive system 11, which is represented herein by a driveshaft 15, rear differential 22, and a pair of road wheels 20. The power transmission 16, motor 14, and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 to the hydrodynamic torque converter 18. The torque converter 18, in turn, drivingly connects the motor 14 to an input shaft 17 of the transmission 16. The electric MGU 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other HEV powertrain configurations, including P0, P1, P2.5, P3 and P4 hybrid powertrains, or may be adapted for a BEV, PHEV, range-extended vehicle, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among members of the planetary gearing subset. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, using a stator (not shown) interposed between the impeller 36 and turbine 38 to selectively alter fluid flow therebetween. The transfer of torque from the engine 12 and motor 14 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached, e.g., via electron beam welding, to an engine-side pump cover 42 such that a working hydraulic fluid chamber is formed therebetween.

Figure 2:
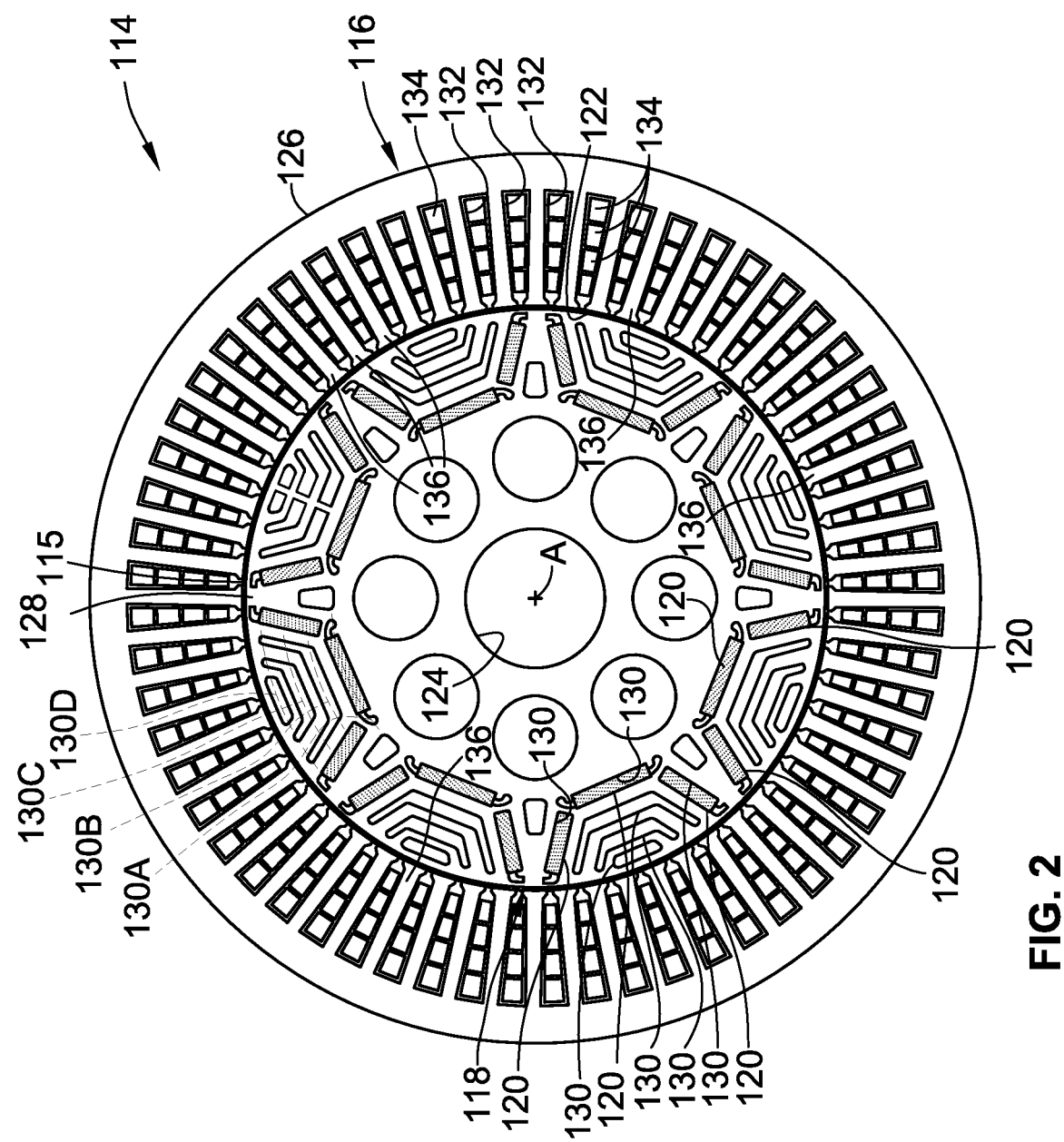
FIG. 2 is a schematic end-view illustration of a representative electric motor with a rotor assembly bearing multiple permanent magnets, a stator assembly bearing multiple hairpin windings, and an oleophobic surface treatment on one or more non-target surfaces in accordance with aspects of the present disclosure.

FIG. 2 illustrates another example of an electric machine 114 that employs magnetic material for exchanging electromagnetic forces with conductive windings to convert electrical energy into mechanical energy. As discussed below, the electric machine 114 utilizes a multiphase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Various alternative embodiments, including alternative rotor assembly architectures and/or alternative stator assembly architectures, may be employed by the electric machine 114 to meet desired operating parameters. For instance, while shown with a radial-flux internal permanent magnet (IPM) arrangement, disclosed concepts are similarly applicable to other PM and other radial-flux configurations as well as axial-flux motors and induction motors.

With continuing reference to FIG. 2, the stator assembly 116 is coaxial with and surrounds the rotor assembly 118 while maintaining a small air gap 115 therebetween. In accord with the illustrated example, this air gap 115 may be not less than about 0.2 millimeters (mm) and not greater than about 1.0 mm, for example, in order to maximize power output and minimize the number of permanent magnets 120 borne by the rotor assembly 118 to provide a desired power output. The representative stator and rotor assemblies 116, 118 of FIG. 2, both of which are portrayed as truncated right-circular cylinders with a generally annular shape, are concentrically aligned about a longitudinal center axis A of the electric machine 114. The stator assembly 116 has a hollow stator core 126 that nests therein the rotor assembly 118; the rotor assembly 118 has a hollow rotor center 124, e.g., that keys, splines, welds, etc., to a motor shaft (e.g., motor output member 29 of FIG. 1). A protective motor housing may surround an outer periphery of the stator 116 and can support the motor shaft of the electric machine 114, e.g., via radial bearings.

Rotor assembly 118 of FIG. 2 is fabricated with a rotor body (or "rotor core") 128 for supporting multiple permanent magnets 120 (twenty-four (24) PMs in the illustrated example) that are circumferentially spaced around the hollow rotor center 124. Specifically, the rotor body 128 is stamped, precision machined, and assembled with multiple rotor slots 130 arranged in radially spaced barrier layers (e.g., four distinct barrier layers). A first barrier layer 130A of slots 130 may be positioned closest to an inner periphery of the rotor body 128, while a fourth barrier layer 130D of slots 130 may be positioned furthest from the rotor body's inner periphery than the other barrier layers. A second barrier layer 130B of slots 130 may be radially interposed between the first and third barrier layers 130A, 130C, while a third barrier layer 130C of slots 130 may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. The rotor body 128 may be fabricated from a metallic material, including a high-grade steel material, which is engineered to maintain high-speed rotational stress within predetermined limits.

Stator assembly 116 of FIG. 2 is fabricated with a stator body (or "stator core") 126 that has multiple axially elongated and radially aligned stator slots 132 (e.g., 60 total slots) that are circumferentially spaced around a hollow stator center 122. Each stator slot 132 extends longitudinally through the stator body 126 along the rotational axis A of the electric machine 114. The stator slots 132 house complementary legs of electrically conductive, multiphase stator windings 134. Stator windings 134—also referred to herein as "hairpin windings"—may be grouped into different sets, each of which may carry an identical number of phases of electrical current, such as three, five, six, or seven phases. In addition, the stator windings 134 may extend axially beyond the longitudinal ends of the stator body 126. A ratio of an outer diameter of the stator body 126 to an axial length of the stator assembly 116 (i.e., the distance along the axis A between the body's longitudinal ends not including any extending portion of the stator windings 134) may be not less than 1.5 and not greater than 3.5, for example, to satisfy predetermined packing space constraints for a particular application of the electric machine 114.

For ease of manufacture, simplified assembly, and increased costs savings, it may be desirable that all of the permanent magnets 120 share an identical, rectangular polyhedron shape. It should be recognized, however, that any one or more or all of the PM bodies may take on innumerable shapes and sizes, including other polyhedral block-type magnets, ring-shaped (annular) magnets, bread-loaf block-type magnets (cross-section with quadrilateral section adjoining semioval section), curved tile magnets, etc. In one non-limiting example, each permanent magnet 120 may have a thickness of about 1.5 mm to 2.5 mm to fit within a slot 130 having complementary dimensions. In at least one embodiment, a total mass of magnet material (i.e., the mass of all magnets 120) used by the electric machine 114 may be about 150 grams to about 250 grams. The permanent magnets 120 of the electric machine 114 may all be fabricated from the same material, such as Neodymium Iron Boron (NdFeB); alternatively, any one or more or all of the magnets 120 may employ different materials, such as Samarium Cobalt (SmCo), Aluminum Nickel Cobalt (AlNiCo), or any combination of rare earth magnet materials.

Figure 3:
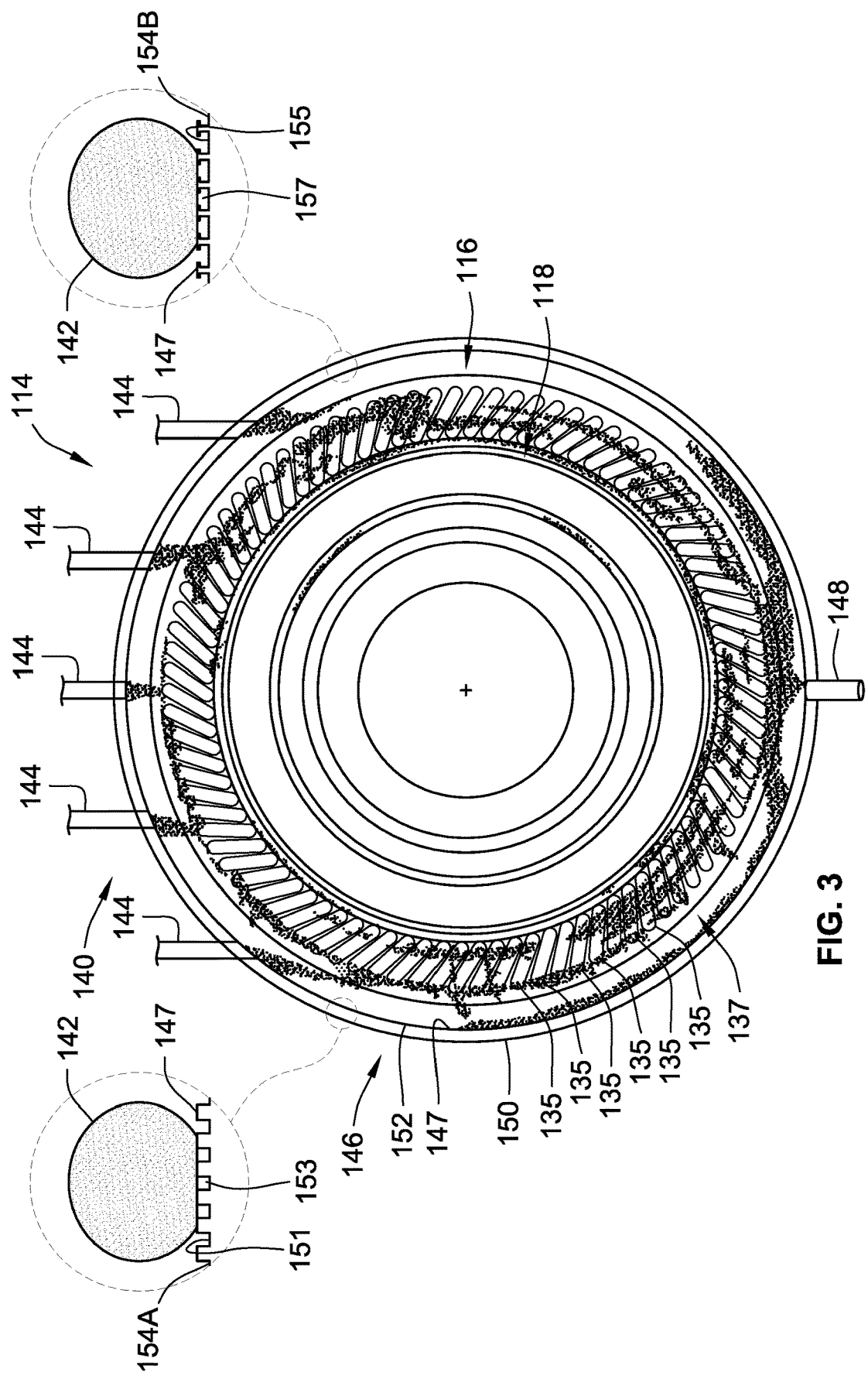
FIG. 3 is another schematic end-view illustration of the representative electric motor of FIG. 2 shown with a protective outer housing receiving dielectric oil from a direct-oil-cooling thermal management system and an oleophobic surface texturization on an internal surface of the motor housing's coolant jacket to repel oil from the housing.

Similar to the permanent magnets 120 of FIG. 2, it may be desirable that all of the multiphase stator windings 134 share an identical construction, including material composition, method of manufacture, and final geometry. Each stator winding 134 may be fabricated from a unitary bar conductor, which is formed into a U-shaped geometry that is defined by a pair of hairpin legs 133 (FIG. 4) that are parallel to each other and project from opposing ends of a curvilinear hairpin crown 135 (FIG. 3). The hairpin legs 133 are inserted into the slots 132 of the stator body 126, with each leg 133 extending through a different stator slot 132 such that the hairpin crown 135 (also known as an "end-turn") extends over several of the stator slots 132 (e.g., a crown may extend across three, four, or five slots). Sets 137 of hairpin stator windings 134 may be inserted in a "staggered" or "interleaved" pattern with respect to adjacent hairpins, as best seen in FIG. 3. Any given stator slot 132 may include a number of hairpin legs 133 (e.g., four in the illustrated example of FIG. 2). Once all of the hairpin windings 134 are inserted into the slots 132 of the stator body 126, the ends of the hairpin legs 133 obtruding from a longitudinal end of the stator center 122 are bent; electrical connections are then made to each winding 134.

During operation of the electric machine 114, e.g., in a regenerative-charging mode, the rotor assembly 118 is rotated via the motor shaft while the stator assembly 116 is held relatively stationary. In so doing, the permanent magnets 120 are moved past the multiphase stator windings 134; the magnetic field emitted by the permanent magnets 120 generates an electric current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at the stator teeth 136. The magnetic field output from the stator teeth 136 interacts with the permanent magnets 120 in the rotor assembly 118 such that the rotor body 128 and attached motor shaft rotate to generate a rotary driving force.

FIG. 3 illustrates the representative electric machine 114 of FIG. 2 operatively connected to a direct-oil-cooling thermal management system 140 for selectively cooling heat-generating components within the motor assembly. In a direct cooling system, a coolant fluid 142, which may be in the nature of an engineered full-immersion liquid coolant or a lubricating dielectric transmission oil (e.g., pumped from transmission oil pan 32), contacts the heated "target" or "thermal" surfaces of one or more motor components to directly extract heat from the component(s). As described above with respect to FIG. 1, for example, an electric machine 114—when configured as a motor/generator unit 14—may be cooled via a common cooling circuit that is shared with the vehicle transmission 16. Alternative architectures may employ a dedicated cooling circuit, not in fluid communication with the transmission 16, to cool the MGU 14. Irrespective of whether a communal system or a dedicated system is utilized, coolant fluid 142 is delivered through one or more coolant fluid inlets 144 into a cooling jacket section of a protective outer motor housing 146 of the electric machine 114. This coolant fluid 142 is distributed across exposed segments of the multiphase stator windings' 134 crowns and/or legs that protrude from the axial ends of the stator core 122. After cooling the electric machine 114, the heat-entrained oil is expelled from the electric machine 114 through one or more coolant fluid outlets 148 in the motor housing 146.

For maximum cooling efficiency, it is often desirable to direct the largest possible volume and mass of coolant fluid onto a target surface of each component being cooled. Moreover, as heat transfer typically increases linearly with wetted area, it is generally desirable to direct coolant fluid over the largest possible contact area of a target surface of each component being cooled. As used herein, the term "wetted area" may be defined to include the ordinary and customary meaning accorded to it by those of ordinary skill in the art, including a total surface area of a target surface that is immersed in, comes into direct contact with, or otherwise interfaces with a fluid medium. Direct-liquid-cooled electric machines, however, experience a measurable quantity of coolant fluid that innately flows over non-target surfaces of the assembly and, as a result, does not interface with a target surface. In the gravity-fed architecture illustrated in FIG. 3, for example, molecule-to-molecule attraction between the coolant fluid 142 and the inner surface of the motor housing 146 generates surface tension that, absent ameliorative measures, causes the incoming coolant 142 to "stick" to the sides of the housing 146 and flow to the fluid outlet 148 without contacting and drawing heat from the stator windings 134.

In addition to ensuring that the electric machine 114 operates within a calibrated temperature range, the electric machine 114 may be designed to achieve a set of predefined operating characteristics, which may include: a relatively high efficiency (e.g., at least about 85% efficiency over a calibrated output power and speed range); a relatively high power density (e.g., greater than about 1500 watts per liter); a relatively high torque density (e.g., greater than about 5 Newton-meters per liter); and a maximum speed of at least about 18,000 rpm. For direct-liquid-cooled motors, however, coolant fluid may flow freely through the motor casing without a predefined path and, thus, may inadvertently enter the air gap between the stator and rotor. Upon entering the air gap, the coolant—which naturally exhibits a much higher viscosity than air—increases friction losses and deteriorates motor efficiency.

Discussed below are oleophobic surface treatments that are chemically configured and strategically positioned to repel coolant fluid from "non-target" surfaces and redirect the coolant to "target" surfaces of an electric machine. As used therein, the term "oleophobic" may be defined to include the ordinary and customary meaning accorded to it by those of ordinary skill in the art, including an object or substance with a chemical aversion to and consequent tendency to repel oil and oil-based substances. Oleophobic surface treatments may be applied to one or more select non-target surfaces, such as non-thermal surfaces or non-contacting, low-friction surfaces, e.g., to improve cooling efficiency or reduce windage losses of an electric machine, respectively. As used herein, the term "non-thermal" may be defined to include the ordinary and customary meaning accorded to it by those of ordinary skill in the art, including an object or surface that does not produce thermal energy (i.e., heat). As a point of comparison, examples of thermal objects include the rotor core 128, which generates rotational friction-based heat, and the hairpin windings 134, which generate electrical resistance-based heat. For purposes of cooling efficiency and effectiveness, it is oftentimes desirable that most if not all of the coolant fluid primarily contacts target thermal surfaces and objects.

As will be described below in the discussion of FIG. 3, coolant fluid may be repelled from at least the upper half of the motor's outer housing 146 and redirected to the exposed ends of the hairpin windings 134 by an oleophobic surface treatment on the inner surface of the outer housing 146. Use of such oleophobic surface treatments will help to improve thermal performance without structural changes to the machine hardware, without the addition of passive flow-control devices, and without the addition of active flow-control logic and hardware. Coolant fluid may be prohibited from entering the air gap between the stator and rotor assemblies 116, 118 by an oleophobic surface treatment on the outer-diameter (OD) surface of the rotor core 128 and the inner-diameter (ID) surface of the stator core 126, as will be described below in the discussion of FIG. 4. At the same time, any extraneous coolant fluid drawn between the rotor and stator assemblies 116, 118 will be expelled out of the air gap by the oleophobicity of the surface treatments. Implementation of such oleophobic features does not require modifications to the existing machine hardware and helps to reduce drag between the rotating rotor and stationary stator.

With reference again to FIG. 3, select non-thermal surfaces of the motor's outer housing 146 are finished with an oleophobic surface treatment that is designed to reduce the surface energy and wetted area of each non-target surface while decreasing the mass of coolant fluid that contacts the non-target surface. In the illustrated example, the non-target surface is an inner surface 147 of the outer housing 146 or select areas of the outer housing's inner surface 147. In accord with the illustrated example, the motor's outer housing 146 is a bipartite construction with a main shell 150 that circumscribes the stator assembly 116 and rotor assembly 118, and a coolant jacket 152 that is bolted, welded, or otherwise securely attached to an axial end of the main shell 150. Fluid inlets 144 of the direct-cooling thermal management system 140 gravity feed coolant fluid 142 through respective ports in the upper quadrant of the coolant jacket 152.

An inner-diameter (ID) surface 147 of an annular segment of the coolant jacket 152 is covered, in whole or in part, by an oleophobic surface treatment 154A, 154B. For ease of manufacture, the entire ID surface 147 may be treated with an oleophobic coating or texturization. Conversely, to minimize manufacturing costs, only select areas of the ID surface 147 may be treated with an oleophobic coating or texturization. By way of example, and not limitation, coolant fluid 142 may naturally pool within the bottom quadrant of the coolant jacket 152 prior to evacuation through the coolant fluid outlets 148; as such, only the top half or two-thirds of the ID surface 147 may be treated.

Disclosed oleophobic surface treatments repel and redirect oil by minimizing the wetted area of its non-target surface while decreasing the mass of coolant fluid contacting the non-target surface. Inset within FIG. 3 are two non-limiting examples of oleophilic surface treatments: an oleophilic surface roughening 154A and an oleophilic surface imprint 154B. The inset view within the upper left-hand corner of FIG. 3 portrays a Cassie-Baxter State (CBS)

oleophobic surface roughening 154A that is typified by multiple recessed grooves 151 that are shaped, sized and arranged to form air pockets 153 between the non-target surface 147 and the coolant fluid 142. For instance, the CBS surface treatment 154A may exhibit a roughness factor (r) of approximately 1.6 or greater, at which point the apparent contact angle is sufficiently high so as to overcome the Wenzel theory. As surface roughness increases, it becomes more difficult for the liquid-based coolant to permeate through the grooves 151 due to the pockets of air 153 that are trapped in the grooves 151.

The inset view within the upper right-hand corner of FIG. 3 portrays a CBS surface imprint 154B with a series of T-shaped recessed channels 155 that are shaped, sized and arranged to form air pockets 157 between the non-target surface 147 and the coolant fluid 142. This oleophobic surface treatments 154A, 154B of FIG. 3 may be etched into each non-target surface 147 and, optionally, may take on an anisotropic pattern. The surface etching may be formed by any suitable technique, including an ultraviolet (UV) etching, a plasma etching, a flame etching, and/or an acid etching. It should be appreciated that the shape, size, location, and relative orientation of the grooves 151 and channels 155 may be modified, individually and collectively, to achieve a desired level of oleophobicity. Disclosed oleophobic surface treatments may be applied to an entire surface or may include partial coatings as well as coatings with patterns. For example, the rotor surface of a radial-flux motor may be treated with a helical pattern of an oleophobic coating, e.g., that will help to expel liquid from inside the air gap. For an axial-flux motor, an oleophobic surface treatment may be applied to juxtaposed, axially spaced rotor and stator surfaces. If the axial-flux motor includes a pair of toroidal rotor plates each located in facing relation to a respective axial end of the stator, oleophobic surface treatments may be applied to both axial end faces of the stator as well as the axial face of each rotor that is facing the stator.

Figure 4:
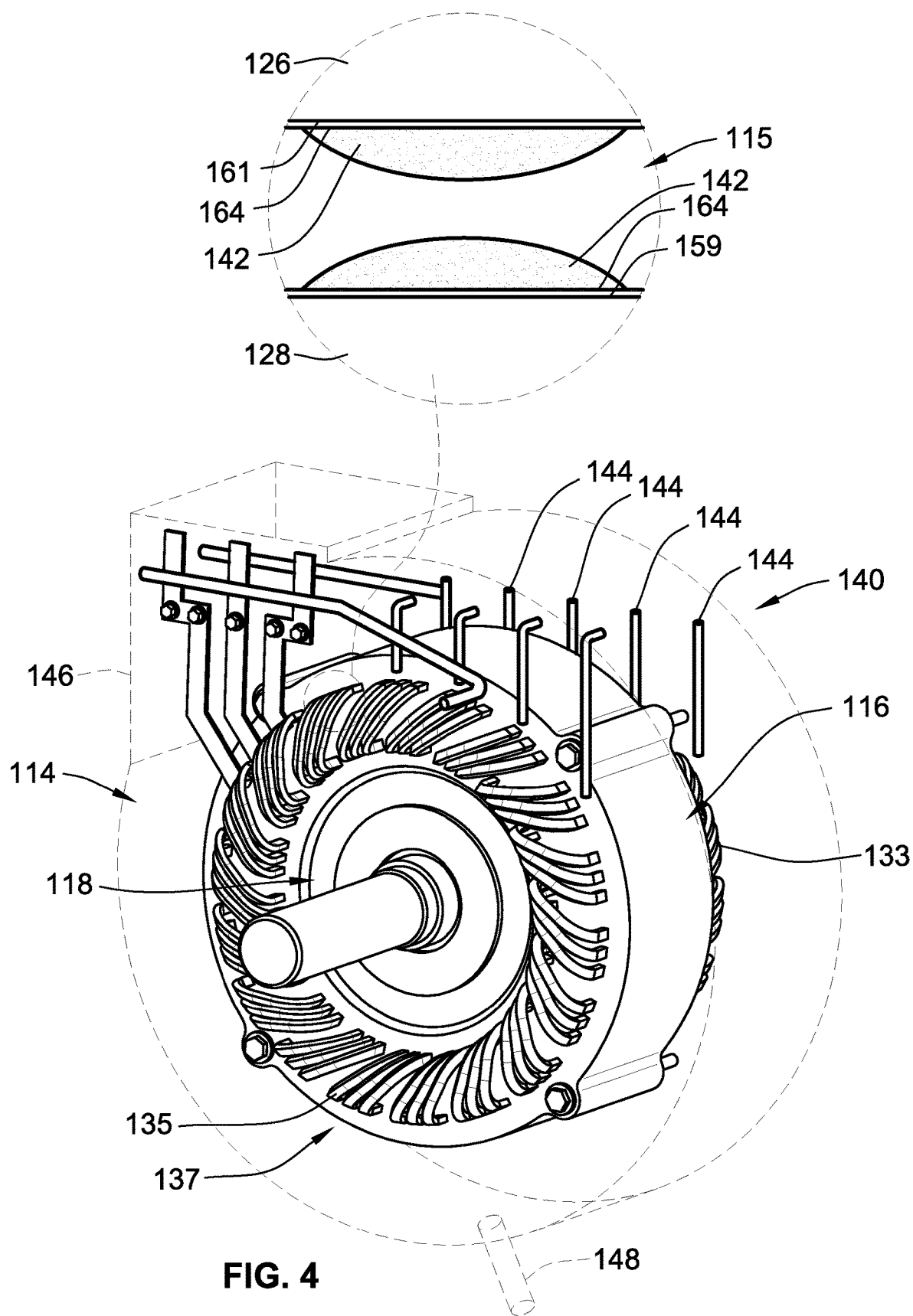
FIG. 4 is an elevated, perspective-view illustration of the representative electric motor of FIGS. 2 and 3 with an oleophobic coating on the facing, radially spaced air-gap surfaces of the rotor and stator.

Turning next to FIG. 4, select non-contacting, low-friction surfaces of the motor's stator and rotor assemblies 116, 118 are covered with an oleophobic surface coating to reduce friction and increase motor efficiency. In the illustrated example, there are two non-target surfaces on two different objects: the outer-diameter (OD) surface 159 of the rotor core 128 and an inner-diameter (ID) surface 161 of the stator core 126. As shown, the rotor's OD surface 159 is concentric with and spaced radially across the air gap 115 from the stator's ID surface 161. An oleophobic surface coating 164 covers some or all of the OD and ID surfaces 159, 161. In this instance, the oleophobic surface treatment 164 may include or consist essentially of a nanoparticle coating that contains silicon dioxide ($SiO_2$), poly(diallyldimethylammonium) (PDDA) chloride, and/or polydioctylfluorene (PFO). Optionally, the oleophobic surface treatment 164 may include or consist essentially of an oil-repelling fluoropolymer coating, such as a polytetrafluoroethylene (PTFE) coating. The oleophobic surface treatment 164 may otherwise include or consist essentially of a chemical deposition treatment of an organic compound. This organic compound may include or consist essentially a dimethylformamide (DMF) material and/or a hexane-based material.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine, comprising:
   an outer housing;
   a direct-cooling thermal management system fluidly connected to the outer housing and configured to circulate thereto a coolant fluid;
   a stator assembly attached to the outer housing and including a stator core with an electromagnetic stator winding mounted to the stator core; and
   a rotor assembly movable with respect to the stator assembly and including a rotor core with a magnet or a rotor winding mounted to the rotor core, wherein the outer housing includes an inner surface extending in an axial direction and having a non-target surface with an oleophobic surface treatment configured to reduce a wetted area of the non-target surface and decrease a coolant mass of the coolant fluid contacting the non-target surface.

2. The electric machine of claim 1, wherein the outer housing includes a main shell and a coolant jacket mounted to the main shell, the coolant jacket receiving therethrough the coolant fluid from the thermal management system, and wherein the inner surface is an inner-diameter (ID) jacket surface of an annular segment of the coolant jacket, the oleophobic surface treatment covering only about half to two-thirds of a top half of the ID jacket surface.

3. The electric machine of claim 2, wherein the coolant jacket includes one or more coolant fluid inlets configured to feed therethrough the coolant fluid from the thermal management system into the outer housing.

4. The electric machine of claim 3, wherein the coolant jacket further includes one or more coolant fluid outlets configured to evacuate therethrough the coolant fluid from the outer housing.

5. The electric machine of claim 4, the coolant jacket circumscribing end portions of the stator assembly and the rotor assembly.

6. The electric machine of claim 1, wherein the outer housing includes a main shell circumscribing the stator assembly and the rotor assembly, and a coolant jacket attached to an axial end of the main shell and fluidly connected to the direct-cooling thermal management system, and wherein the inner surface is an inner-diameter (ID) jacket surface of an annular segment of the coolant jacket, the oleophobic surface treatment covering substantially all of the ID jacket surface.

7. The electric machine of claim 1, wherein the oleophobic surface treatment includes a Cassie-Baxter State (CBS) surface roughening with a plurality of recessed grooves configured to form air pockets between the non-target surface and the coolant fluid.

8. The electric machine of claim 1, wherein the oleophobic surface treatment includes a Cassie-Baxter State (CBS) surface imprint with a series of T-shaped recessed channels configured to form air pockets between the non-target surface and the coolant fluid.

9. The electric machine of claim 1, wherein the oleophobic surface treatment includes a nanoparticle coating containing silicon dioxide ($SiO_2$), poly(diallyldimethylammonium) (PDDA) chloride, and/or polydioctylfluorene (PFO).

10. The electric machine of claim 1, wherein the oleophobic surface treatment includes an oil-repelling fluoropolymer coating.

11. The electric machine of claim 1, wherein the oleophobic surface treatment includes a surface etching with an anisotropic pattern applied onto the non-target surface.

12. The electric machine of claim 11, wherein the surface etching is a plasma etching, a flame etching, and/or an acid etching.

13. The electric machine of claim 12, wherein the organic compound includes a dimethylformamide (DMF) material and/or a hexane-based material.

14. The electric machine of claim 1, wherein the oleophobic surface treatment includes a chemical deposition treatment of an organic compound applied onto the inner surface of the outer housing.

15. A motor vehicle comprising:
a vehicle body;
a plurality of road wheels attached to the vehicle body; and
a traction motor attached to the vehicle body and operable to drive one or more of the road wheels to thereby propel the motor vehicle, the traction motor including:
a motor housing;
a direct-oil-cooling thermal management system fluidly connected to the motor housing and configured to circulate thereto a dielectric oil;
a stator assembly rigidly mounted inside the motor housing, the stator assembly including an annular stator core defining a hollow center and a plurality of circumferentially spaced stator slots, and a plurality of U-shaped electromagnetic hairpin windings packaged inside the stator slots; and
a rotor assembly rotatably disposed inside the hollow center of the annular stator core, the rotor assembly including a cylindrical rotor core defining a plurality of circumferentially spaced rotor slots, and a plurality of permanent magnets mounted inside the rotor slots and spaced across an air gap from the hairpin windings,
wherein an inner surface of the motor housing extends in an axial direction and has a non-target surface with an oleophobic surface treatment configured to reduce a wetted area of the non-target surface and decrease a coolant mass of the dielectric oil contacting the non-target surface.

16. A method of assembling an electric machine, the method comprising:
providing an outer housing of the electric machine;
fluidly connecting a direct-cooling thermal management system to the outer housing to circulate thereto a coolant fluid;
attaching a stator assembly to the outer housing, the stator assembly including a stator core and an electromagnetic winding mounted to the stator core;
movably mounting a rotor assembly adjacent the stator assembly, the rotor assembly including a rotor core and a magnet or a rotor winding mounted to the rotor core spaced across an air gap from the winding; and
applying an oleophobic surface treatment to a non-target surface on an axially extending inner surface of the outer housing, the oleophobic surface treatment configured to reduce a wetted area of the non-target surface and decrease a coolant mass of the coolant fluid contacting the non-target surface.

17. The method of claim 16, wherein the outer housing includes a main shell circumscribing the stator assembly and the rotor assembly, and a coolant jacket attached to an axial end of the main shell and fluidly connected to the direct-cooling thermal management system, and wherein the oleophobic surface treatment covers substantially all of an inner-diameter (ID) ring surface of an annular segment of the coolant jacket.

18. The method of claim 16, wherein the rotor core is concentrically aligned inside a hollow center of the stator core, and wherein an outer-diameter (OD) surface of the rotor core and an inner-diameter (ID) surface of the stator core are at least partially covered by the oleophobic surface treatment.

19. The method of claim 16, wherein the oleophobic surface treatment includes:
a Cassie-Baxter State (CBS) surface roughening with a plurality of recessed grooves configured to form air pockets between the non-target surface and the coolant fluid; and/or a CBS surface imprint with a series of T-shaped recessed channels configured to form air pockets between the non-target surface and the coolant fluid.

20. The method of claim 16, wherein the oleophobic surface treatment includes:
a nanoparticle coating containing silicon dioxide, poly(diallyldimethylammonium) chloride, and/or polydioctylfluorene; and/or
an oil-repelling fluoropolymer coating.

* * * * *